June 1, 1954  J. R. GOMERSALL  2,680,183
ENCLOSED HEATING ELEMENT
Filed Feb. 23, 1950  3 Sheets-Sheet 1

INVENTOR.
JOHN R. GOMERSALL
BY
Oscar W. Yiene

June 1, 1954   J. R. GOMERSALL   2,680,183
ENCLOSED HEATING ELEMENT
Filed Feb. 23, 1950   3 Sheets-Sheet 2
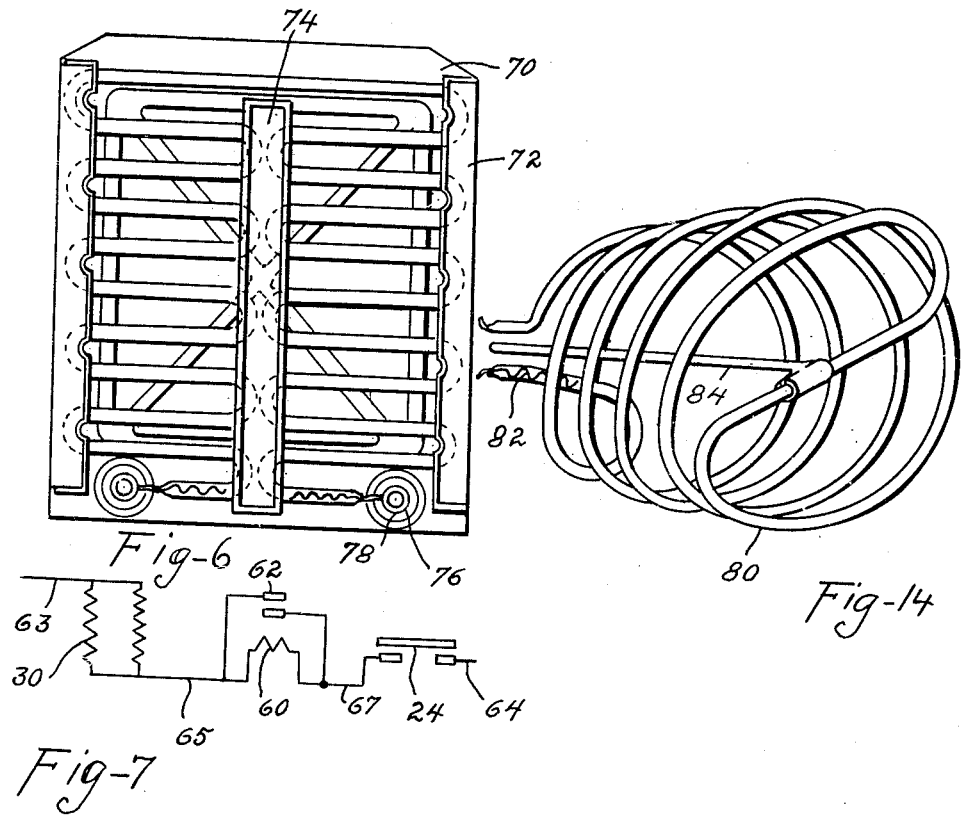
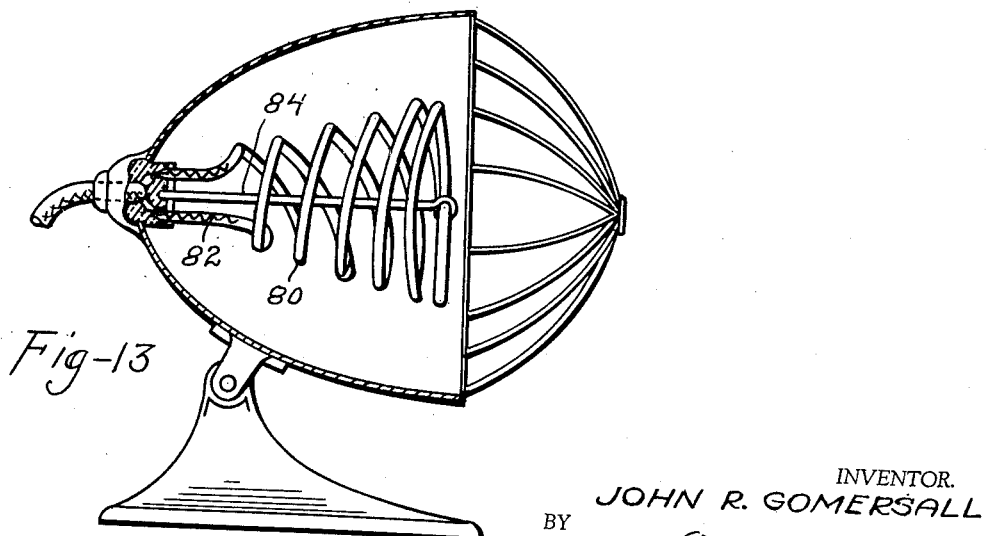
INVENTOR.
JOHN R. GOMERSALL
BY Oscar W. Jine
ATTORNEY.

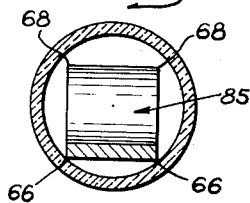
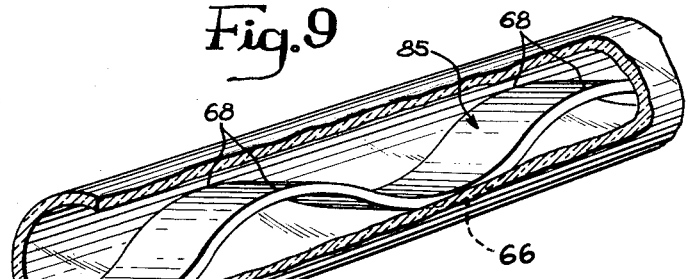
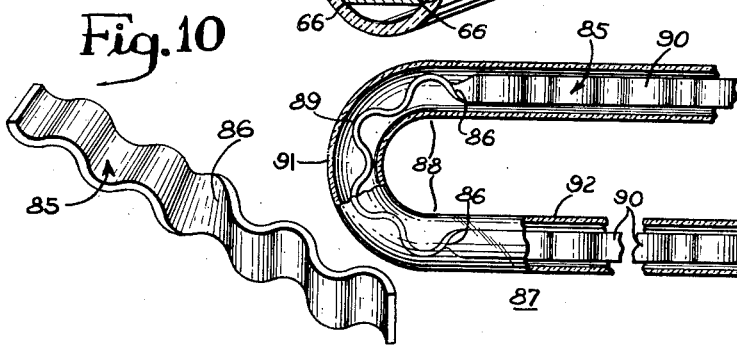
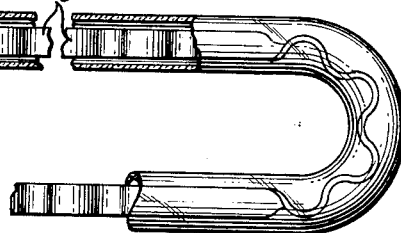
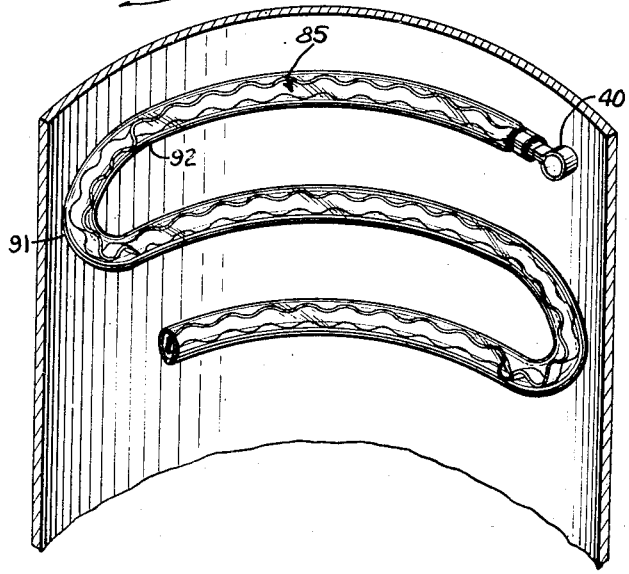
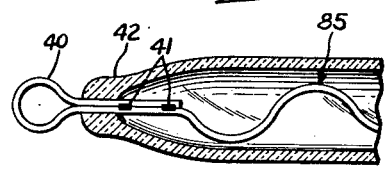
INVENTOR.
John R. Gomersall Patented June 1, 1954

2,680,183

UNITED STATES PATENT OFFICE 2,680,183

ENCLOSED HEATING ELEMENT

John R. Gomersall, Elgin, Ill., assignor to McGraw Electric Company, Elgin, Ill., a corporation of Delaware Application February 23, 1950, Serial No. 145,752

4 Claims. (Cl. 219—19)

The present invention relates to electric heating elements.

It is an object of the present invention to provide an improved electric-resistance heating element suitable for electric toasters, broilers, cooking ovens, drying ovens, space heaters and the like, that is cheaper in construction, less fragile, less subject to corrosion, longer lived, and more pleasing in appearance than heating elements heretofore known.

A further object is the provision of an improved construction for an electrically heated device.

According to my invention, I enclose a resistance conductor in a tube of electric-insulating material such as glass, porcelain or plastic resin. Although certain glass tube enclosures have been proposed heretofore, they have been expensive or of limited size, or have run the glass too hot. In the preferred manner of carrying out my invention I employ a round tube of a material that is transparent to a substantial part of the radiant heat that will emanate from the heating conductor. I employ a ribbon-like conductor, crimp it into a zig-zag shape, and thread it into the tube having a sufficiently large bore that the conductor is loose therein. I then form the tube into a pattern that is suitable for the particular device in which it is to be used. This method of construction is simple and easy, and subject to accurate control. It permits the conductor to be spaced easily along the length of the tube either at uniform intervals or in any desired pattern of non-uniformity and insures that it will not be damaged in the fabrication process. The conductor touches the tube at only a few spots so that there is only slight conduction of heat thereto. This construction permits a high conductor temperature for efficient radiation accompanied by a low tube temperature for maximum durability and safety.

These and other objects and advantages of my invention will be apparent from the following description of certain specific embodiments thereof which illustrate the manner in which the invention may be put into practice. In the drawings:

Fig. 6 is a view of the heating element of Fig. 5 in a mounting therefor;

Fig. 7 is a schematic circuit diagram for the toaster of Fig. 1;

Fig. 8 is a detail view on an enlarged scale, consisting of a section taken along the line 8—8 of Fig. 4;

Fig. 9 is an oblique view, partly in section, taken along the line 9—9 of Fig. 8;

Figs. 10 and 11 are views of a modified construction;

Fig. 12 is a view of a further modification;

Fig. 13 is an elevation, partly in section, of a reflecting radiant heater having a heating element embodying my present invention;

Fig. 14 is a perspective view of the heating element of Fig. 13; and

Fig. 15 is an enlarged section of the terminal of the heating element of Fig. 4.

Figure 1:
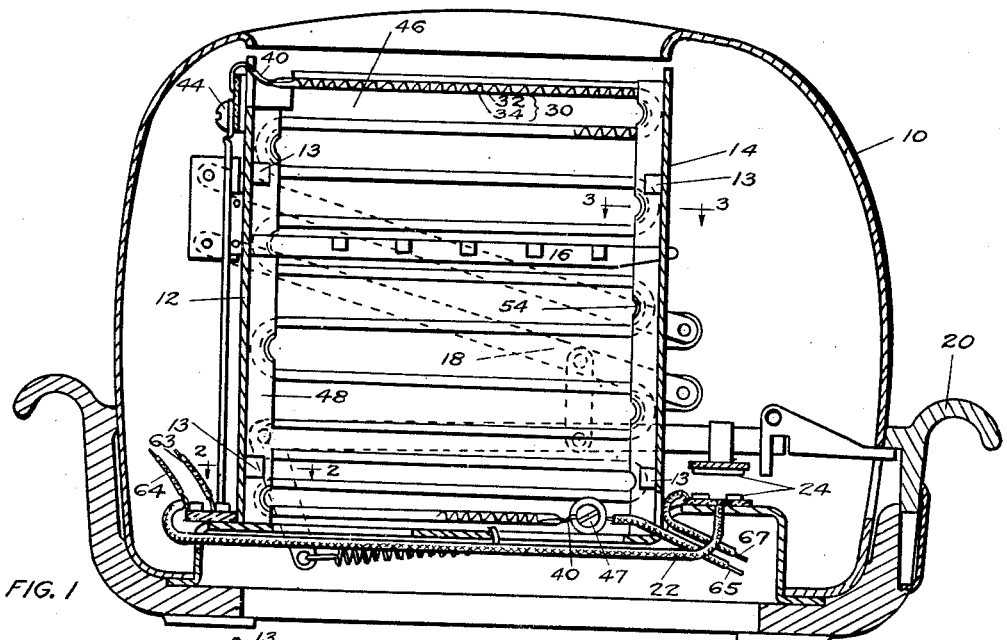
Figure 1 is a sectional elevation of an electric toaster containing heating elements constructed in accordance with the present invention.

The specific toaster of Fig. 1 includes a casing 10, oven frame members 12 and 14, a vertically movable rack 16 for supporting a slice of bread, levers 18 for supporting and moving the rack 16, circuit wires 22 for the electric heating elements of the toaster, a switch 24 for controlling the circuits, and a handle 26 for controlling the rack and switch.

Figure 3:
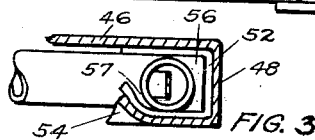
Fig. 3 is a detail on an enlarged scale, constituting a section taken on the line 3—3 of Fig. 1.
Figure 4:
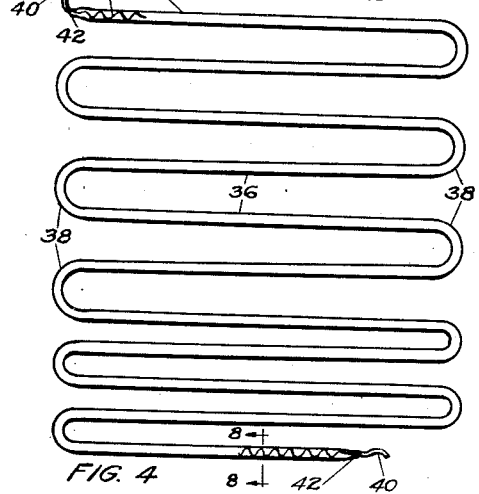
Fig. 4 is a view of the heating element of the toaster of Fig. 1.

The toaster also includes a pair of electric heating elements 30, each of which, as is best shown in Fig. 4, comprises a glass tube 32 through which is threaded a resistance conductor 34. The tube is bent into a rectangular pattern consisting of parallel runs 36 connected at their ends by U-bends 38. The crimped conductor 34 extends from end to end of the tube, and lead-in pieces 40, which may consist of the ends of the wire, are sealed in the ends of the tube at 42. Preferably the end of the wire is doubled back and spot-welded as at 41 in Fig. 15 to provide a double thickness, and therefore a lower wire temperature in the glass seal and the terminal. This bent glass tube 32 is mounted on a metal sheet 46 (Figs. 1, 2 and 3) which has U-shaped channels 48 on opposite edges for receiving the U-bends 38. Lying within each channel 48 and between the metal of the plate and the glass of the tube 32 is a strip of asbestos paper 52 which conforms to the shape of the channel 48 and lies around the glass tube, as is shown for example in the sectional view of Fig. 2. Within the curve of each of the U-bends 38 the edge of the channel 48 is bent in as at 54 in Figs. 1 and 3 to hold the tube in place. The channels 48 hold the glass tube loose, leaving space as at 56, 57 and 58, shown exaggerated in Figs. 2 and 3, to allow for any difference of expansion between the glass tube and its supporting structure when heated.

Figure 2:
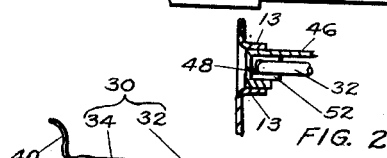
Fig. 2 is a detail, consisting of a section taken on the line 2—2 of Fig. 1.

The metal sheet 46 is preferably bright so that it serves as a reflector for radiant heat and thereby both confines most of the heat to the oven space and increases the intensity of radiation applied to the bread. As is shown in Fig. 2, the oven-frame members 12 and 14 have bent-out ears 13 which constitute guides within which the channel pieces 46 lie for supporting the heating element in the toaster. The upper lead 40 of conductor 34 is brought out to a screw terminal 44 (Fig. 1) on the outer face of the oven frame 12. The lower lead is riveted under a metal grommet supported by insulating washers on plate 46, to which grommet, circuit-wire 65 is connected by a bolt 46.

As is shown diagrammatically in Fig. 7, the separate heeating elements 36 of the toaster are connected in parallel with each other and the resulting group is connected in series circuit with a terminal timer which includes a heating element 60 and its shunt contacts 62, which are not otherwise shown in the drawings, and also in series with the main switch 24. Power is applied to the two leads 63 and 64.

As is shown more clearly in Figs. 8 and 9, the resistance conductor 34 preferably is in the form of a thin ribbon which is deformed and lies loose in the tube. Preferably I first crimp the ribbon to give it a generally zig-zag shape so that it comprises a series of longitudinal waves. A single short length of ribbon such as this usually has excellent uniformity, but various samples of ribbon, even from the same spool, may have materially different thicknesses. In many heaters, such as those used for electric toasters, it is desirable that the heating units be provided with equal electric resistances so that the several elements of any one toaster will perform alike. Accordingly, in forming the crimps, I make them sharp so that the crimped ribbon will be short. I cut the formed ribbon to the desired resistance value, stretch it out to the required length, attach or form the lead-ins, and insert it in a straight glass tube. I then form the tube to the desired shape by heating it. Finally, I soften the ends of the tube and pinch them against the wire. As may be seen in Figs. 8 and 9, this crimped ribbon conductor 34 touches the glass tube only at longitudinal intervals at the crests 66 and 68 of the waves (Fig. 9) and then only at the edges of the ribbon (Fig. 8). Furthermore the wire lies loose in the glass tube and so will actually touch the tube only at a few of these corner-like points. That is to say, the edges of the ribbon at the crests 66 and 68 of only some of the longitudinal waves contact the tube while the crests of other of the waves will be spaced from the tube, as shown in Fig. 8. The overall thickness or height of the ribbon determined by the wave formation is such that the zone of rectangular cross section defined by the waves (Fig. 8) in its greatest dimensions will be less than the diameter of the tube. Accordingly, while the heat-generating ribbon is entirely supported by the glass tube, it touches it only at widely spaced points and is able to conduct only a small amount of heat thereto. Since glass is transparent, most of the heat that radiates from the ribbon passes out through the glass without heating it, and consequently the glass, since it has a large surface in contact with the air, operates at a temperature far below that of the ribbon.

Figure 5:
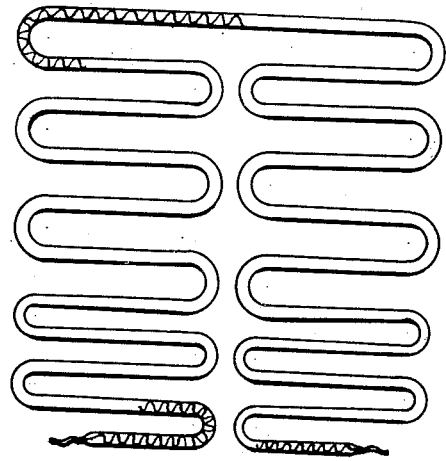
Fig. 5 shows a heating element of a modified construction.

Fig. 5 shows an alternative configuration for the glass tube of a heating element for a toaster such as that of Fig. 1. The configuration of the glass tube consists of two similar patterns of short horizontal runs connected by U-bends, with the two patterns connected together by a single long horizontal run across the top. This arrangement permits both of the terminals to be located at the bottom edge of the pattern. A supporting plate for the heating element of Fig. 5 is shown in Fig. 6. There a plate 70 has formed side channels 72 similar to the channels 48 of Fig. 1 and in addition has a separate channel piece 74 running down its center for holding the U-bends near the center of the heating element. The leads are riveted under metal grommets 76 which are insulated from the plate 70 by insulating washers 78.

The ribbon conductor bends most easily about the longer axis of its cross section, and since it is loose and therefore free to turn in the glass tube, the crimped ribbon in the curved parts of the glass tube springs into the orientation shown in Figs. 1, 4 and 5 so that the plane of the ribbon is perpendicular to the plane of the curve of the tube. In the toaster of Fig. 1, for example, the ribbon is merely crimped and not twisted axially and consequently it faces edge-on toward the bread. In the construction of Figs. 10 and 11, the ribbon 85 is first crimped, and then twisted 90° axially at selected points such as 86. The ribbon conductor, so formed, is inserted in a straight glass tube in which it fits loose, and the tube is then heated and bent into its final shape. The points 86 at which the ribbon was twisted axially will have been selected to come at the junctions 88 between the curved and straight portions 91 and 92 of the final assembly 87. That part 89 of the ribbon in the curve will orient itself edge-on as in Fig. 1, and because of the 90° axial twist at each of the points 86 that part 90 in the straight runs will lie broad-on. An axial twist is a formation wherein cross sections transverse the longitudinal axis of the convolute ribbon taken at spaced points of said axis have different orientations about that axis.

In Fig. 12 the construction of Fig. 11 has been bent into a surface that is part of an erect cylinder so that the straight portions 90 of Fig. 11 have become curved in a horizontal plane, but with a less sharp curvature, and therefore longer radius of curvature, than the U-bends. Here the 90° angle of axial twist at point 86 in the ribbon corresponds to the difference in direction of the radii of curvature of the two curved portions of the tube, so that the longer axis of the ribbon in each part of the tube lies approximately perpendicular to the radius of curvature of that part. The straight runs in the tubes, as in Figs. 4 and 11, should be regarded as portions of zero curvature and therefore as having a different curvature than do the U-bends. The radius of curvature of such straight portions must of course be regarded as having infinite value and indeterminate direction.

My new and improved heating element is useful also in various other cooking and heating devices, as for example the reflecting radiant heater of Fig. 13. There a glass tube 80 having a crimped ribbon conductor 82 extending therethrough is formed in the shape of a bifilar tapered helix. The specific shape of this helix is best seen in Fig. 14. A metal rod 84 extending through the helix provides support at the outermost part of the tube. For such exposed constructions, the heating element of my present invention is superior to unenclosed heating conductors because it presents far less danger to persons from burns and electric shock. For the same reasons my element is far more suitable for use in explosive atmospheres.

For use in toasters and the like, I now prefer that the insulating tube be made of borosilicate glass such as Pyrex glass. Such glass is transparent to a substantial part of the radiation from the conductor, which is operated at red heat, and withstands the temperatures of 800–1000° F. to which it may be subjected. For greater heat resistance I may employ a high-silica glass. For uses involving lower temperatures, as for example certain warming ovens, drying ovens and space heaters, I may employ resinous insulating materials such as polytrifluorochloroethylene, methyl silicones, polystyrene, methyl methacrylate, or nylon. Such substances do not resist heat as well as does glass, but they are less brittle and for that reason will be preferred for certain uses when the temperatures involved are low enough. Porcelain, though far less transparent, and less easily formed, is mechanically stable at higher temperatures than is glass, and so may be preferred when the higher transparency and pliability are not required. Polytetrafluoroethylene is resistant to higher temperatures than are the other resins but is limited to uses in which pliability is not required.

Because I enclose my heat-generating metal conductor, it is kept out of direct contact with the atmosphere and only a limited supply of oxygen is available for its chemical erosion. Accordingly I can operate a glass enclosed element of my present invention at a higher temperature, and obtain a longer life than is possible with comparable open-wire heating elements. The higher permissible temperature not only provides a more intense radiant heat but also permits the use of a smaller element, particularly with a shorter total length of conductor and glass tube, with a consequent saving in cost.

In many heating elements, as for example those used in toasters, it is desirable that the heat-storage capacity be low so that it can cause very little delay in the heating and cooling of the heating element. Such delay adds to the difficulties of controlling the toaster to make toast of the same color regardless of the temperature to which the toaster may have been heated by previous operations. The low temperature of the tube helps to hold down the amount of heat that is stored in this manner. In addition, my present construction provides adequate support for the tube and puts little or no strain upon it. Consequently the tube can have a thin wall to further reduce the mass and the heat storage capacity of the heating element.

I have found that under certain conditions a conductor in a tube will produce a high-pitched, squeal-like noise as it heats up. This noise appears to be produced by the movement of the heated metal of the conductor across the surface of the tube, and to occur in the curved parts of the tube. I find that this noise can be at least reduced, and usually eliminated by using a thin ribbon conductor and by having it fit loose in the tube. As between a ribbon and a round wire having the same heat dissipating surface per unit length, the ribbon has the smaller cross-sectional area, and even with the same cross-sectional area the ribbon would be less stiff. Consequently the ribbon is more compliant and exerts far smaller forces against the tube, and so has less tendency to set up noise when it moves slightly as it expands under rising temperature. The fact that the crimped ribbon lies loose further limits the mechanical forces it can exert against the wall of the tube and so further reduces any tendency to generate noise.

Although glass is an excellent electric insulator at room temperature it is likely to become sufficiently conducting at high temperatures, for example, when the glass reaches red heat, to conduct currents that might be dangerous to a person handling the toaster or other appliance in which the heating element was employed. The ability of the glass tube to operate at a low temperature in my heater construction reduces the hazards from such possible leakage currents.

The asbestos paper spacers 52 that hold the glass tube out of direct contact with the metal supporting channels 48 not only provide a soft and yielding mounting for the tube and reduce rattling that might result from the loose mounting, but also add materially to the electric insulation. In particular they provide a low-leakage support for the glass tubes when they become hot enough to conduct objectionable electric currents. Although asbestos may be somewhat hygroscopic and by itself might contain enough moisture at room temperatures to permit dangerous leakage currents, nevertheless, as the toaster heats up, the moisture is thoroughly expelled to leave the asbestos paper non-conducting by the time the glass reaches a temperature at which the glass, by itself, might conduct current. The asbestos and glass consequently provide a composite insulating construction which assures freedom from dangerous, or even annoying, leakage current at room temperature, at high operating temperatures and during the transition from one to the other.

It will be apparent to those skilled in the art that my invention is capable of numerous modifications and variations within the scope of the appended claims.

I claim:

1. An electric heating element comprising a tube of heat-resistant electric-insulating material and of curved cross-section and a crimped metal electric heating resistance ribbon extending through the tube having longitudinal waves defining a zone of rectangular cross-section, said ribbon making contact only at longitudinal intervals and only at its edges at crests of waves with the wall of the tube.

2. A heating element comprising a tube of heat-resistant electric insulating material and of circular cross section having a series of portions extending in spaced parallel relation and U-shaped bends in the tube connecting each adjacent pair of said parallel portions, and a crimped metal electric heating resistance ribbon having longitudinal waves defining a zone of rectangular cross section extending continuously through all of said parallel tube portions and said tube bends, said ribbon making contact only at longitudinal intervals and only at its edges at crests of waves with the wall of the tube and the opposite ends of said ribbon having sealed connections with and projecting outwardly beyond the opposite ends of the tube.

3. An electric heating element as in claim 2 wherein the greatest dimensions of the zone of rectangular cross section defined by the waves of the ribbon are shorter than the diameter of the tube and the edges of the ribbon at recurrent wave crests are spaced from the wall of the tube.

4. A heating element according to claim 2 wherein the faces of the waves of the ribbon in each U-bend of the tube lie substantially perpendicularly to the bend plane and the faces of the waves of the ribbon in the parallel tube portions lie substantially perpendicularly to the wave faces in said U-bends of the tube.

References Cited in the file of this patent

UNITED STATES PATENTS

| Number | Name | Date |
|---|---|---|
| 1,032,267 | Bastian | July 9, 1912 |
| 1,104,054 | Linder | July 21, 1914 |
| 1,334,850 | George et al. | Mar. 23, 1920 |
| 1,395,963 | Kuppers | Nov. 1, 1921 |
| 2,061,516 | Frese | Nov. 17, 1936 |
| 2,150,285 | Marek et al. | Mar. 14, 1939 |
| 2,244,960 | Nelson | June 10, 1941 |
| 2,332,392 | Minter | Oct. 19, 1943 |
| 2,344,908 | Whitman | Mar. 21, 1944 |
| 2,464,147 | Myers | Mar. 8, 1949 |

FOREIGN PATENTS

| Number | Country | Date |
|---|---|---|
| 425,043 | Great Britain | Mar. 4, 1935 |